(12) United States Patent
Smelyanskiy et al.

(10) Patent No.: US 9,678,750 B2
(45) Date of Patent: *Jun. 13, 2017

(54) VECTOR INSTRUCTIONS TO ENABLE EFFICIENT SYNCHRONIZATION AND PARALLEL REDUCTION OPERATIONS

(71) Applicant: Intel Corporation, Santa Clara, CA (US)

(72) Inventors: Mikhail Smelyanskiy, San Francisco, CA (US); Victor Lee, Santa Clara, CA (US); Christopher Hughes, Santa Clara, CA (US); Daehyun Kim, San Jose, CA (US); Yen-Kuang Chen, Cupertino, CA (US); Changkyu Kim, San Jose, CA (US); Jatin Chhugani, Santa Clara, CA (US); Anthony D. Nguyen, Castro Valley, CA (US); Sanjeev Kumar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 13/795,234

(22) Filed: Mar. 12, 2013

(65) Prior Publication Data
US 2014/0068226 A1   Mar. 6, 2014

Related U.S. Application Data

(63) Continuation of application No. 12/079,774, filed on Mar. 28, 2008, now Pat. No. 9,513,905.

(51) Int. Cl.
*G06F 15/00* (2006.01)
*G06F 15/76* (2006.01)
(Continued)

(52) U.S. Cl.
CPC ........ *G06F 9/30036* (2013.01); *G06F 9/3004* (2013.01); *G06F 9/30018* (2013.01);
(Continued)

(58) Field of Classification Search
None
See application file for complete search history.

(56) References Cited

U.S. PATENT DOCUMENTS 4,953,101 A   8/1990   Kelleher et al.
5,513,353 A   4/1996   Fujimoto
(Continued)

FOREIGN PATENT DOCUMENTS

CN   1750659      3/2006
CN   101061460    10/2007
(Continued)

OTHER PUBLICATIONS

Japan Patent Office, Japan Office Action mailed Nov. 11, 2014, in Japanese Application No. 2014-001279.
(Continued)

*Primary Examiner* — George Giroux
(74) *Attorney, Agent, or Firm* — Trop, Pruner & Hu, P.C.

(57) ABSTRACT

In one embodiment, a processor may include a vector unit to perform operations on multiple data elements responsive to a single instruction, and a control unit coupled to the vector unit to provide the data elements to the vector unit, where the control unit is to enable an atomic vector operation to be performed on at least some of the data elements responsive to a first vector instruction to be executed under a first mask and a second vector instruction to be executed under a second mask. Other embodiments are described and claimed.

15 Claims, 3 Drawing Sheets

(51) Int. Cl.
*G06F 9/30* (2006.01)
*G06F 9/38* (2006.01)
*G06T 5/40* (2006.01)
*H04N 1/407* (2006.01)
*G06K 9/62* (2006.01)

(52) U.S. Cl.
CPC ...... *G06F 9/30021* (2013.01); *G06F 9/30032* (2013.01); *G06F 9/30043* (2013.01); *G06F 9/30087* (2013.01); *G06F 9/3834* (2013.01); *G06F 9/3885* (2013.01); *G06K 9/6212* (2013.01); *G06T 5/40* (2013.01); *H04N 1/4074* (2013.01)

(56) References Cited

U.S. PATENT DOCUMENTS

| | | | |
|---|---|---|---|
| 5,717,501 | A | 2/1998 | Iwamoto et al. |
| 5,818,443 | A | 10/1998 | Schott |
| 5,825,677 | A | 10/1998 | Agarwal et al. |
| 5,872,987 | A | 2/1999 | Wade |
| 6,460,127 | B1 | 10/2002 | Akerib |
| 7,421,564 | B1 | 9/2008 | Rahim et al. |
| 7,421,565 | B1 | 9/2008 | Kohn |
| 7,627,723 | B1 | 12/2009 | Buck |
| 8,081,823 | B2 * | 12/2011 | Zandifar ............ G06K 9/0055 382/181 |
| 2002/0168106 | A1 * | 11/2002 | Trajkovic ............ G06K 9/4647 382/170 |
| 2004/0054877 | A1 | 3/2004 | Macy et al. |
| 2004/0181652 | A1 | 9/2004 | Ahmed et al. |
| 2004/0236920 | A1 | 11/2004 | Sheaffer |
| 2006/0153441 | A1 | 7/2006 | Li |
| 2007/0283127 | A1 | 12/2007 | Kohn |
| 2008/0071851 | A1 | 3/2008 | Zohar et al. ............... 708/626 |
| 2009/0172365 | A1 | 7/2009 | Orenstien |
| 2009/0249026 | A1 * | 10/2009 | Smelyanskiy ...... G06F 9/30032 712/4 |
| 2014/0068226 | A1 | 3/2014 | Smelyanskiy et al. |

FOREIGN PATENT DOCUMENTS

| | | |
|---|---|---|
| EP | 1 873 627 | 2/2008 |
| JP | H5108699 | 4/1993 |
| JP | 200057111 | 2/2000 |
| JP | 2007334563 | 12/2007 |

OTHER PUBLICATIONS

German Patent and Trademark Office, Office Action mailed Dec. 3, 2012 in German application No. 11 2009 000 741.4-53.
A. Shahbahrami, et al., "SIMD Vectorization of Histogram Functions," 2007, pp. 174-179.
T. Scheuermann, et al., "Efficient Histogram Generation Using Scattering on GPUs," 2007, pp. 33-37.
B. He et al., "Efficient Gather and Scatter Operations on Graphics Processors," 2007, pp. 46:1-46:12.
J. H. Ahn, et al., "Scatter-Add in Data Parallel Architectures," 2005, pp. 132-142.
The State Intellectual Property Office of the People's Republic of China, Office Action and Search Report issued Dec. 14, 2012 in Chinese application No. 200980110598.7.
U.S. Appl. No. 12/005,575, filed Dec. 27, 2007, entitled "Instructions and Logic to Perform Mask Load and Store Operations," by Doron Orenstien, et al.
Patterson, David. Hennessy, John. "Computer Architecture: A Quantitative Approach". Morgan Kaufmann Publishers, Inc. Second Edition, 1996. pp. 634-639.
Japan Patent Office, Notice of Rejection mailed Sep. 8, 2015 in Japanese Patent Application No. 2014-001279.
United States Patent and Trademark Office, Office Action mailed Jan. 3, 2016 in U.S. Appl. No. 12/079,774.
United States Patent and Trademark Office, Office Action mailed Mar. 21, 2016 in U.S. Appl. No. 12/079,774.
State Intellectual Property Office, Peoples Republic of China, First Office Action mailed Apr. 6, 2016 in Chinese Patent Application No. 201410196526.1.
U.S. Patent and Trademark Office, Appeal 2013-007559 mailed Sep. 29, 2015 in U.S. Appl. No. 12/079,774.
United States Patent and Trademark Office, Reply to Office Action mailed Mar. 21, 2016, filed on Jun. 20, 2016 in U.S. Appl. No. 12/079,774.

* cited by examiner

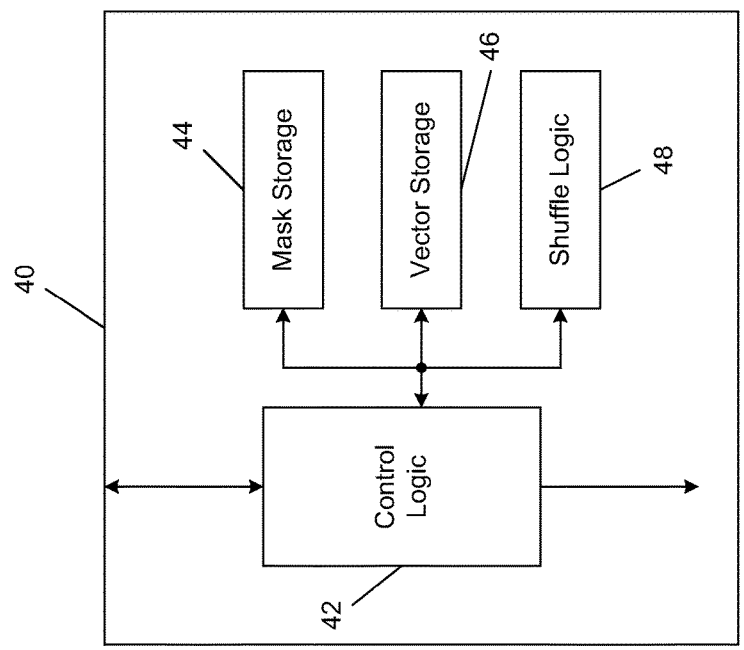
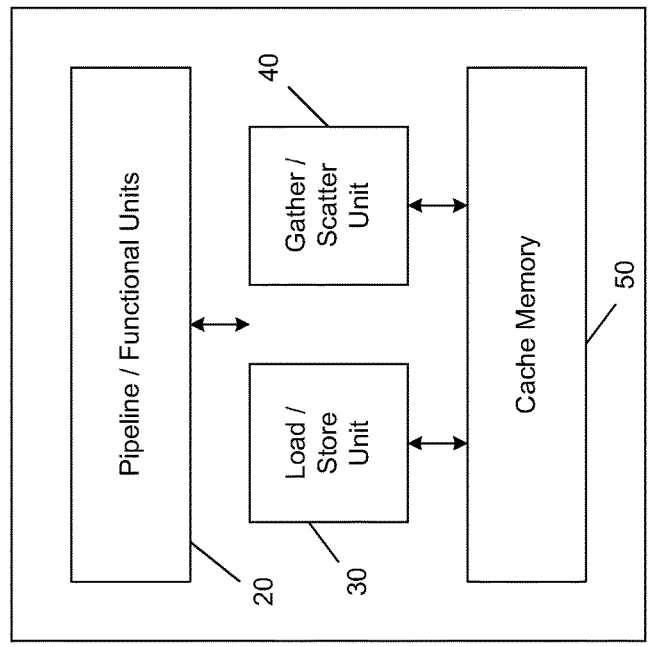
FIG. 1B
FIG. 1A

VECTOR INSTRUCTIONS TO ENABLE EFFICIENT SYNCHRONIZATION AND PARALLEL REDUCTION OPERATIONS

This application is a continuation of U.S. patent application Ser. No. 12/079,774, filed Mar. 28, 2008, the content of which is hereby incorporated by reference.

BACKGROUND

Many applications have large amounts of data-level parallelism and should be able to benefit from single-instruction multiple-data (SIMD) support. In SIMD execution, a single instruction operates on multiple data elements simultaneously. This is typically implemented by extending the width of various resources such as registers and arithmetic logic units (ALUs), allowing them to hold or operate on multiple data elements, respectively. However, many such applications spend a significant amount of time in atomic operations on a set of sparse locations and thus see limited benefit from SIMD, as current architectures do not support atomic vector operations.

In many applications, synchronization primitives and parallel reduction operations are often performed in multi-processor systems. Synchronization primitives ensure a program executes in a correct order when multiple threads work cooperatively. These primitives are often implemented using an atomic read-modify-write operation. A reduction is a common operation found in many scientific applications. When multiple threads perform reductions in parallel, atomic read-modify-write sequences are typically used to ensure correctness in race conditions.

Modern parallel architectures come equipped with SIMD units to improve the performance of many applications with data-level parallelism. To maintain SIMD efficiency, such architectures allow not only SIMD arithmetic operations but also SIMD memory reads and writes (through gather-scatter units). However, none of these architectures support SIMD atomic operations. The result is that these atomic operations cannot be vectorized and therefore must be implemented using scalar code. This can degrade the SIMD efficiency considerably, especially when the SIMD width, i.e., the number of simultaneously processed elements, is large (e.g., 16).

Scatter reductions are common operations in many applications. For example, a scatter-add operation can be used to enable multiple values of a first array to be reduced into (i.e., added to) selected elements of a second array according to a distribution of indices, which can often be random. Because of this, it is difficult to efficiently process multiple elements concurrently (i.e., in SIMD mode).

Histogram calculations are common operations in many image processing applications. For example, a histogram is used to track the distribution of color values of pixels in an image. However, updates to the histogram array may be random, depending on input data to an array. In particular, indices of neighboring elements may point to the same histogram bin. This condition makes it very difficult to process multiple data concurrently (i.e., in SIMD mode).

BRIEF DESCRIPTION OF THE DRAWINGS

FIG. 1A is a block diagram of a processor core in accordance with one embodiment of the present invention.

FIG. 1B is an example representation of a gather/scatter unit in accordance with an embodiment of the present invention.

DETAILED DESCRIPTION

Figure 2:
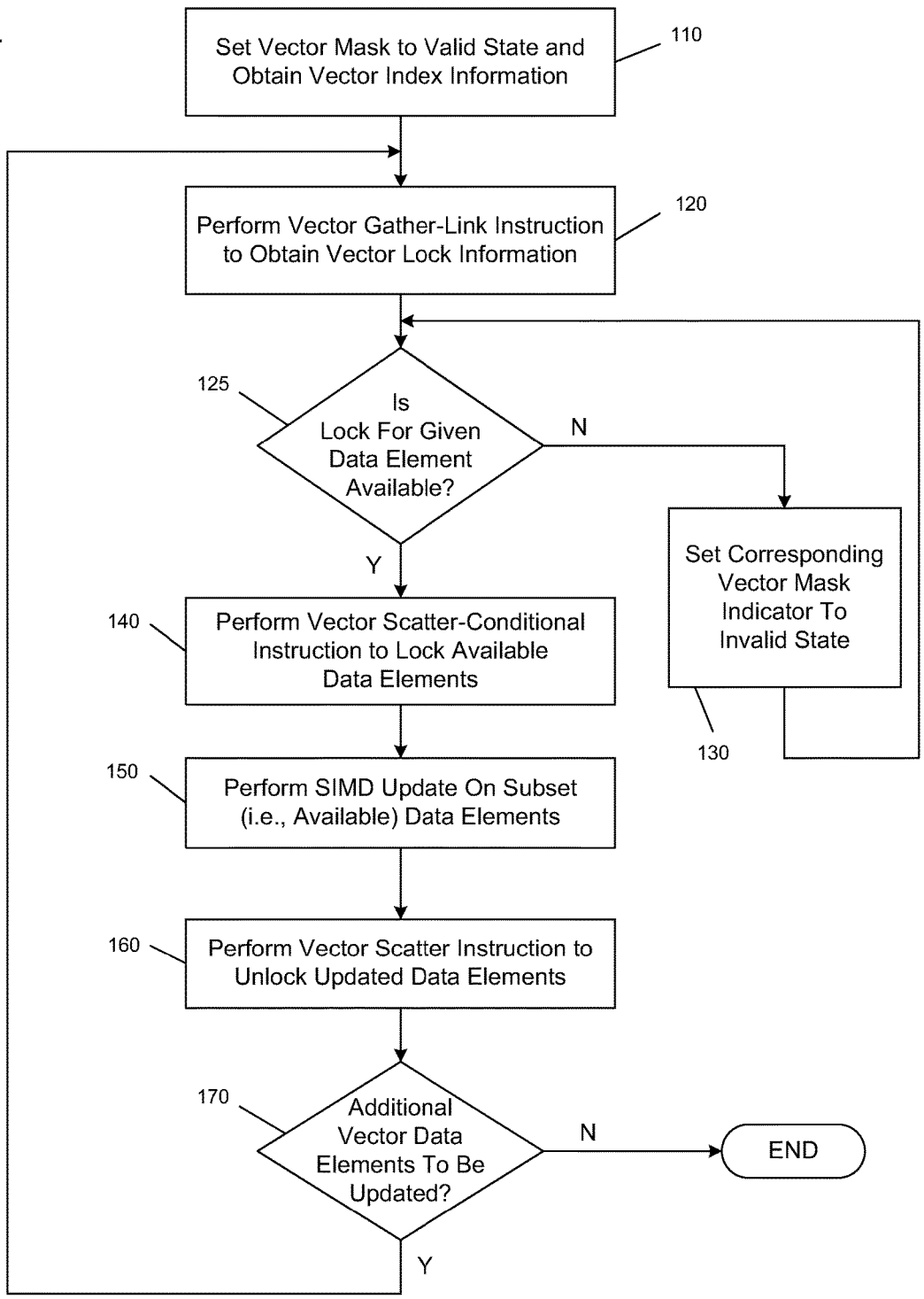
FIG. 2 is a flow diagram for performing atomic vector operations in accordance with one embodiment of the present invention.

Embodiments may extend memory scatter-gather functionality to provide support for atomic vector operations. In various embodiments, SIMD instructions may be provided to enable atomic operations. Specifically, a so-called vector gather-linked instruction and a vector scatter-conditional instruction may be provided to efficiently support atomic operations to multiple non-contiguous memory locations in SIMD fashion. Note as used herein, the terms "vector" and "SIMD" are used interchangeably to describe multiple data elements that are acted upon by a single instruction. In this way, these instructions may enable SIMD atomic operations to more efficiently implement synchronization primitives and parallel reduction operations. Still further, other vector instructions may provide processor assistance for in-processor reduction operations and histogram calculations.

In one embodiment, a gather-scatter unit can be configured to allow atomic SIMD memory operations. Efficiently utilizing SIMD in applications in which data structures have elements that are accessed indirectly (e.g., A[B[i]]) rather than contiguously often requires rearranging data, which can result in substantial overhead. To address this overhead, hardware support to enable loading and storing non-contiguous data elements in a SIMD fashion can be provided to perform gather/scatter operations. Namely, a gather operation reads (gathers) multiple data elements from indirectly addressed locations, based on addresses contained in the source SIMD register, and packs them into a single SIMD register. Conversely, a scatter operation unpacks the elements in a SIMD register and writes (scatters) them into a set of indirectly addressed locations.

Specifically, a gather-linked instruction in accordance with one embodiment of the present invention contains reservations for the locations being gathered, and a scatter-conditional instruction in accordance with an embodiment of the present invention will only scatter values to elements whose corresponding reservations are still held. Since a scatter-conditional may only succeed for a subset of the elements (or for none at all), the instruction has an output mask which indicates success or failure, analogous to the output of a store-conditional. An output mask for the gather-linked instruction may allow more flexibility in hardware implementations. Embodiments may extend scalar atomic memory operations, namely a pair of scalar instructions called load-linked (LL) and store-conditional (SC). LL returns the value stored at a shared location and sets a reservation indicator associated with the location. SC checks the reservation indicator. If it is valid, a new value is written to the location and the operation returns success, otherwise the value is not written and the operation returns a flag indicating failure. Conceptually, for each shared memory location, for each hardware context, there is a reservation bit; the reservation bits associated with a shared memory location are cleared when that location is written by any hardware context. One use of LL and SC is in implementing higher level synchronization primitives, such as lock and unlock. Locks are used to assure atomicity of accesses to shared data by multiple threads. However these instructions operate only on a single element at a time. Embodiments may be used to overcome this limitation of these instructions.

On a SIMD architecture, up to VLEN (SIMD vector length) updates to VLEN locations can be executed in parallel using SIMD if they are known to update distinct memory locations. However, guaranteeing the atomicity of VLEN simultaneous updates requires acquiring and releasing VLEN locks. If scalar instructions are used, VLEN iterations of a loop to detect, acquire, update VLEN data elements and release the locks are executed, and various overheads are associated with such operations.

Another common operation in many applications is a reduction operation. In multiprocessor systems, a reduction can be performed by multiple threads to improve performance. However, in a parallel implementation, atomic access to a shared data structure is used to ensure correctness, when multiple threads simultaneously update the same memory location. Thus, a reduction operation may use scalar load-linked and store-conditional instructions to assure atomicity of simultaneous updates; however, such operations cannot be executed in SIMD fashion without an embodiment of the present invention.

Efficient SIMD-friendly implementation of synchronization primitives and parallel reduction can be realized in various embodiments, by providing SIMD support for LL and SC instructions. More specifically, to improve SIMD efficiency of synchronization primitives and parallel reductions, two instructions, a gather-linked (vgatherlink) instruction and a scatter-conditional (vscattercond) instruction, may provide for load-linked and store-conditional operations for SIMD architectures. In addition, a vector-gather instruction (vgather) and a vector-scatter (vscatter) instruction available on a SIMD architecture can be leveraged. The vector-gather instruction may be as follows:

vgather base, Addr, Dst which causes VLEN data elements to be gathered from VLEN (not necessarily contiguous, and possibly duplicated) memory locations, whose addresses are computed from base and Addr (base[Addr[0]], . . . , base[Addr[VLEN−1]]), and stored contiguously into the destination, Dst. Note that Addr and Dst can be either in memory or a SIMD register. The vector-scatter instruction may be as follows:

vscatter base, Addr, Src

This instruction scatters VLEN contiguous data elements from a source, Src, into VLEN (not necessarily contiguous, but unique) memory locations whose addresses are stored in an address operand, Addr. As in the case with the vgather instruction, Addr and Src can either be either in memory or in a SIMD register.

Thus, based on these two vector instructions and scalar LL and SC instructions, a vector gather-linked instruction, vgatherlink, may be defined as follows:

| Opcode | Destination | Base | Source | Mask |
|---|---|---|---|---|
| vgatherlink | Dst | memory | Addr | F |

This instruction acts to gather and link multiple data elements, and also reserve the memory locations of the gathered data elements to be used by a later scatter-conditional instruction. The instruction thus attempts to gather and link up to VLEN memory locations, memory[Addr[0]], memory[Addr[VLEN−1]], into a destination, Dst, under mask. It may fail in gathering and linking some of the data elements. If so, it only gathers and links a subset of VLEN memory locations and sets the corresponding bits of the mask F to a valid state, e.g., a "1" state. The failed elements will have their corresponding mask F set to an invalid state, e.g., a "0" state.

Similarly, vscattercond may be defined as follows:

| Opcode | Source | Base | Destination | Mask |
|---|---|---|---|---|
| vscattercond | Src | memory | Addr | F |

This instruction acts to conditionally scatter multiple data elements to memory, and more specifically, only to the memory locations that are reserved by the vgatherlink instruction and whose reservations are still valid (i.e., no writes to the location have happened since the vgatherlink). The instruction thus conditionally scatters up to VLEN data elements from a source, Src, into VLEN memory locations, memory[Addr[0]], . . . , memory[Addr[VLEN−1]], under mask, F. For all elements under mask, for which the individual scatter conditional operation failed, the corresponding elements of the mask F are set to an invalid state, e.g., "0" state.

Using a combination of vgatherlink and vscattercond instructions, and mask manipulations (see below), a subset of VLEN atomic operations (e.g., acquiring a subset of VLEN locks) can be performed, and the corresponding mask elements be set to 1. This mask can be used to safely execute in the SIMD region, because only the subset of SIMD elements under mask corresponding to the successful atomic operations will be enabled. Referring now to Table 1, shown is an example code segment using vgatherlink and vscattercond to acquire and release a subset of VLEN locks.

TABLE 1

```
V0 = 0;
V2 = 1;
for(i=0; i < nupdates; i += VLEN) {
  F = 0xffff; // set all mask elements to 1
  Vind = SIMD_glb_index(i:i+VLEN, F); // index computation
  using SIMD
  // iterate until all SIMD elements have been computed
  do {
      F1 = F; // save mask
      // gather-linked up to VLEN values; set corresponding F element to
      0 on failure vgatherlink V1, lockloc, Vind, F;
      // set bit in F to 0 when corresponding lock (V1) is not free
      (i.e., F &= !V1) vcmppi F{F}, V0, V1, eq
      // attempt to obtain the free locks; set corresponding F element to
      0 on failure vscattercond V2, lockloc, Vind, F;
      SIMD_update(&glb_data, Vind, F);
      // unlock VLEN locations
      V3=0;
      vscatter V3, lockloc, Vind, F;
      // subset of SIMD work is done: set F to 1 for remaining elements
      F ^= F1;
  } while (F != 0);
}
```

The above code updates a subset of VLEN SIMD elements under mask in each iteration of the while loop, until all VLEN elements are updated. The SIMD elements under mask are updated atomically. Note that it is possible that due to lock contention with other threads, no locks will be acquired in a given iteration of the while loop. This will result in the SIMD_update region executing under mask where all elements are in 'invalid' state, acting as a no operation (NOP). Since only a subset of locks under mask are acquired, no sorting of locks is required. Lock sorting would typically be used in the corresponding serial implementation of the critical section to avoid deadlock. Lock sorting can be avoided in the serial implementation at the expense of more complicated and inefficient code. In the above code, a deadlock can be prevented by only acquiring non-contended locks and proceeding with the execution. An example implementation of this code is described below with regard to FIG. 2.

Note that the definition of the vgatherlink and vscattercond instructions is flexible and can enable different usage scenarios. For example, in the above code, we could instead first iterate to acquire the locks until all VLEN locks have been acquired, and then perform all VLEN updates simultaneously.

Note that while a scalar load-linked instruction always succeeds, a vgatherlink instruction in accordance with an embodiment of the present invention is allowed to fail on a subset of addresses. Failure can happen for a number of reasons, for example: (1) other threads have the subset of addresses linked; (2) a conflict in the cache: if the only way to bring a new line is to evict another linked line (e.g., due to limited associativity); and (3) the line is at a remote location or in memory and will take a long latency to be fetched (e.g., a cache miss occurs).

There are many other situations in which a designer can choose to allow a vgatherlink instruction to fail. Allowing failure can potentially reduce the amount of contention while improving efficiency. Namely, waiting for a vgatherlink instruction to succeed for VLEN addresses may increase contention, while immediately issuing vscattercond instructions only to the subset of successfully linked addresses reduces the amount of contention.

In the above discussion it is assumed that all lock locations are unique. This constraint forces a programmer to partition the locks into subsets of unique locks prior to entering the while loop, which is a potentially expensive computation. For example, when VLEN elements are simultaneously inserted into a tree, the programmer may have no way of knowing at compile time which elements are unique.

Partitioning locks into unique subsets in software is expensive. However, the semantics of vgatherlink and vscattercond instructions are such that partitioning is not required. These instructions differ from scatter-conditional and conventional scatter operations in their handling of element aliasing, where a single SIMD operation attempts to write multiple values to the same location. One and only one of the aliased element updates will succeed, indicated by the output mask. In various embodiments, since both gatherlinked and scatter-conditional instructions have output masks, a hardware designer can choose to implement the alias detection and resolution as part of either instruction. Since vgatherlink or vscattercond instructions only process a subset of unique addresses in Addr, this guarantees that only unique locks will be acquired in a given iteration of the while loop, and the SIMD_update instruction will only be performed on the unique elements within the group of VLEN elements.

While the above discussion has focused on lock acquires, vgatherlink and vscattercond have at least one other usage scenario: parallel reductions. In many applications, the SIMD_update instruction does not entail accessing other objects in shared memory. Therefore, such objects do not need to have a lock obtained to guarantee atomicity for the update. Instead, the vgatherlink and vscattercond instructions can be used on the data being updated, as follows in Table 2:

TABLE 2

```
for(i=0; i < nupdates; i += VLEN) {
    F = all valid;
    Vind = SIMD__glb__index(i:i+VLEN, F);
    do {
        F1 = F;
        vgatherlink V, glb__data, Vind, F;
        SIMD_update(V, F);
        vscattercond V, glb__data, Vind, F;
        F ^= F1;
    } while (F != 0);
}
```

In this code, the vgatherlink instruction gathers data elements from the global data structure (glb_data) to the vector register V. It also sets the bits of the mask register F to 0 corresponding to the failed gathered elements. The SIMD_update instruction updates the vector register V. Then, the vscattercond instruction scatters the vector register V to the global data structure, and also sets the bits of the mask register F to 0 corresponding to the failed scattered elements. After the vscattercond instruction, the mask register F contains a 1 for each element that was successfully updated in this iteration. An exclusive-OR (XOR) operation with F1 clears those mask bits and sets to 1 the bits in the mask corresponding to the elements that have not yet been updated.

Applying vgatherlink and vscattercond instructions directly to perform parallel reductions may provide several benefits. First, the code is more efficient because there is no need to grab and release locks (i.e., the code in Table 2 is much shorter than the code in Table 1). Second, the memory behavior is better because there is no need to access memory for the lock variables.

The vector instructions described herein can be implemented in many ways. Such instructions can leverage various SIMD hardware resources, including a reservation location for each element in the vgatherlink and vscattercond operations. In one embodiment, a granularity of one reservation location per 32-bit element may be used. However other embodiments may have a smaller or larger granularity. The number of elements that a vgatherlink instruction gathers and vscattercond scatters in a single iteration can be a design parameter, as allowing larger number of elements to be gathered and scattered provides better performance, it requires more resources.

In one embodiment, the vgatherlink and vscattercond instructions may have the external behavior shown in Appendix I and II, respectively.

Embodiments thus may provide efficient support for atomic operations in a SIMD architecture. In this way, the need to serialize atomic accesses to multiple memory locations can be avoided using the instructions described herein, to enable access to such multiple locations using an efficient loop construction, e.g., a do-while loop.

Embodiments of the instructions may be used in various applications. For example, for the use of locks, the described instructions may be used to perform operations in varying applications such as physical simulation applications. Similarly, for reduction operations, the described instructions can be used in connection with various applications, for example, image processing applications and applications utilizing sparse linear algebra primitives. Of course, the scope of the present invention is not limited in this regard and the instructions described herein can be used in other applications.

Referring now to FIG. 1A, shown is a block diagram of a processor core in accordance with one embodiment of the present invention. As shown in FIG. 1A, processor core 10 may be a single core of a multicore processor including a plurality of cores configured similar to that of core 10. As shown in FIG. 1A, core 10 may be of an architecture that supports SIMD operation. For example, various components of a pipeline/functional units 20 may be extended to provide for vector support, e.g., via extended registers and functional units such as ALUs and so forth.

Referring still to FIG. 1A, pipeline/function units 20 may be coupled to a load/store unit (LSU) 30 and a gather/scatter unit (GSU) 40. LSU 30 may handle execution of load and store instructions with a cache memory 50 which in one embodiment may be a level 1 (L1) cache. Similarly, GSU 40 may handle execution of gather and scatter instructions, such as the vector gather-linked and vector scatter-conditional instructions described herein.

While these units may be configured in many different manners, referring now to FIG. 1B, shown is an example representation of a gather/scatter unit in accordance with an embodiment of the present invention. As shown in FIG. 1B, GSU 40 may include control logic 42, which may include various hardware, firmware, and software or combinations thereof to handle execution of various vector instructions, such as the instructions described herein. To effect such operations, control logic 42 may be in communication with a mask storage 44, which may include one or more storage locations to provide storage of mask information, e.g., in the form of a vector mask that can be used as input and/or output masks for the different instructions described herein. Still further, control logic 42 may be in communication with a vector storage 46, which may be a vector register file or other temporary storage to provide storage of vector data elements that are used as operands for the various instructions described herein. Still further, a shuffle logic 48 may be provided to enable shuffling of various data elements according to vector shuffle instructions such as described herein that may be implemented by control logic 42. As still further shown in FIG. 1B, control logic 42 may in turn communicate with upstream portions of a core, e.g., the pipeline/functional units 20 of FIG. 1A and a downstream portion of the core, e.g., cache memory 50. While shown with this particular implementation in the embodiment of FIG. 1B, understand the scope of the present invention is not limited in this regard.

In one embodiment GSU 40 may handle a vector gather-linked operation the same as a gather operation, except that it generates and sends load-linked requests to memory 50. Similarly, GSU 40 may send store-conditional requests to the L1 cache instead of normal stores. In addition, GSU 40 assembles and stores the output mask for these operations based on success or failure of the individual requests.

In one embodiment, to support gather-linked and scatter-conditional instructions, a cache tag structure of cache memory 50 may include a so-called gather load control store (GLSC) entry per cache line. A GLSC entry may contain two fields: a valid bit and a hardware thread identifier (ID) (to distinguish among the simultaneous multithreaded (SMT) threads on the same core). For gather-linked operations, as GSU 40 sends load-linked requests to cache memory 50, some of the requests may fail, while other requests will succeed. For each request that succeeds, the cache updates the corresponding GLSC entry (e.g., the valid bit is set and requester's thread ID is filled), GSU 40 sets the corresponding bit in the output mask, and GSU 40 places the data in the destination register. For scatter-conditional operations, GSU 40 sends a set of store-conditional requests to the cache memory 50. An individual store-conditional request succeeds if the corresponding GLSC entry valid bit is set and the GLSC entry thread ID matches the requester's thread ID. In one embodiment, this will be true if the corresponding cache line has not been modified by an intervening write or evicted since it has been successfully linked by a matching load-linked request from a gather-linked operation. When an individual store-conditional request succeeds, the cache clears the GLSC valid flag, modifies the data in the cache line, and GSU 40 sets the corresponding bit in the output mask.

Referring now to FIG. 2, shown is a flow diagram for performing atomic vector operations in accordance with one embodiment of the present invention. As shown in FIG. 2, method 100 may use vector gather-linked instructions and vector scatter-conditional instructions to enable atomic updates to vector data elements. Note that while shown with this particular implementation in the embodiment of FIG. 2, the scope of the present invention is not limited in this regard. As shown in FIG. 2, method 100 may begin at block 110, where a vector mask may be set to a valid state and vector index information may be obtained. Such operations may be performed to thus set an input mask to a valid state and to compute index indices for (i.e., obtain addresses) for SIMD data elements.

Control then passes to block 120, where a loop may be initiated that is iterated until all SIMD elements have been updated. This loop may begin by performing a vector gather-linked instruction to obtain vector lock information. Specifically, this gather-linked may thus be used to obtain up to VLEN lock values. If unsuccessful for a given data element, as determined at diamond 125, indicating that a lock for a given data element is not available, control passes to block 130, where a corresponding vector mask indicator for the unavailable lock may be set to an invalid state. If instead given lock is available, a vector scatter-conditional instruction may be executed to attempt to lock such available data elements (block 140). For any successful operations that obtain a lock, an output mask associated with the vector scatter-conditional instruction may remain set, while for any such locks that were not able to be obtained, the mask may be instead set to an invalid state. Control then passes to block 150, where a SIMD update may be performed on a subset of the data elements. More specifically, for any data elements for which the lock was obtained at block 140, the SIMD update may be performed. Control then passes to block 160, where a vector scatter instruction may be executed to unlock the updated data elements. Then it may be determined at diamond 170 whether additional vector data elements remain to be updated. If so, control passes back to block 120. Otherwise, method 100 may conclude. While shown with this particular implementation in the embodiment of FIG. 2, the scope of the present invention is not limited in this regard.

Embodiments may further be used to enable scatter reductions in SIMD mode. Embodiments conceptually divide a scatter reduction operation into three operations. First, partition a first array into chunks of length equal to the SIMD width. This array may be an array of integer or floating-point values of given lengths, e.g., a first array, a so-called C array having values of length N. Note a further array, referred to as a so-called B array, may be an integer index array of length N whose elements are in the range [1 . . . M] and defines the mapping of each element of the C array onto another array, A, of length M. Note that the distribution of indices (i.e., the contents of array B) is often random.

Moreover, multiple entries of the B array may have the same value, that can cause multiple values of the C array to be reduced into the same element of the A array. Second, perform a local reduction within each chunk (assumed to be in SIMD registers); at the end of each of these operations, a SIMD register will hold values corresponding to unique elements of A within the chunk (i.e., no two values within the register need to be reduced to the same element of the array), and all the duplicate values have been reduced into this unique element. Third, perform a gather-update-scatter memory operation for each chunk to complete the reduction for the chunk.

Embodiments may provide yet another vector instruction to assist in performing SIMD reductions in registers. More specifically, the instruction may be used to find the unique items in a first SIMD register, and generate a shuffle control for the duplicated items. After such operations, the shuffle control can be used to produce a second SIMD register from the first SIMD register, such that pairs of duplicate elements are in corresponding locations in their respective SIMD register. Further, an accumulation of these two vector registers is performed to "reduce" corresponding duplicate elements from each pair into a destination vector register. The entire sequence is repeated until the elements remaining all map to distinct elements of A. This sequence accumulates as many pairs of duplicate elements as possible in each iteration to minimize the number of iterations. Alternative embodiments may only accumulate a subset of the pairs of duplicates in order to reduce the implementation cost.

Prior to the start of the second operation above, arrays B and C can be split into various chunks (as in the first operation). The chunks are loaded into two SIMD registers (for convenience, we will call these registers Vb and Vc). The second operation combines elements of Vc that have the same value in the corresponding elements of Vb. To perform this third operation, a sequence of instructions can be used to serially check each element of Vb against other elements in Vb to determine if there is any match. If matches are found, the corresponding elements in Vc are reduced. The following Table 3 is the pseudo code of this second operation:

TABLE 3

```
Load Vb;
Load Vc;
F = all valid; // for valid elements in Vb and Vc
For (i=0; i<SIMD_WIDTH; i++) {
    If (F[i] is valid) {
        For (j=i+1; j<SIMD_WIDTH; j++) {
            If ((F[j] is valid) and (Vb[i] == Vb[j])) {
                Vc[i] += Vc[j];
                F[j] = invalid;
            }
        }
    }
}
```

However, this serial implementation has a complexity of $O(N^2)$. Accordingly, embodiments of the present invention may provide a vector instruction, referred to herein as a vector shuffle-to-reduce instruction, vshuf2reduce, to reduce the complexity of this operation to $O(\log N)$. This Vshuf2reduce instruction takes one source Vb and an input mask (indicating which elements are valid), and produces a shuffle control (in a scalar register) and updates the mask register. In one embodiment, the instruction has the following format:

| Opcode | Dest | Source | Mask | Description |
|---|---|---|---|---|
| vshuf2reduce | Dst | Vb | F | Compares elements in Vb (all to all) and creates a shuffle control for combining elements that have the same value in Vb in tree fashion. |

Thus, this vshuf2reduce instruction performs all-to-all comparisons of elements in Vb against other elements in Vb to create a shuffle control for Vc. The shuffle control is used as an input to a shuffle instruction to line up in pairwise fashion elements in Vc with other elements in Vc that have the same index value in Vb. In addition, the mask F is returned, in which an elements corresponding to one of the two items from each pair is set to invalid.

The third operation above is to combine the output of the second operation, Voutput, with the current contents of C. This involves reading the elements of C that correspond to Voutput, accumulating those values with Voutput, and then storing the newly accumulated values back to their corresponding locations in C.

The following Table 4 is pseudo code of performing a scatter reduction using this instruction.

TABLE 4

```
L1: F = F1 = all valid; SC = identity
L2: Vshuf2reduce SC, Vb, F; // SC=shuffle_control
L3: While (F != F1) {
L4:     Vshuffle of Vc to Vtmp with control in SC;
L5:     Vadd Vtmp to Vc with mask F;
L6:     F1 = F;
L7:     Vshuf2reduce SC, Vb, F;
L8: }
```

The vshuf2reduce instruction generates shuffle controls for a tree reduction. That is, the while loop is expected to complete within $O(\log(VLEN))$ steps in the worst case (when all elements are the same and hence reduce into a single element), significantly improving the performance of the second operation of the scatter reduction operation described above. If all elements of Vc have unique values of Vb, the loop may complete in a single iteration.

In one embodiment, the vshuf2reduce instruction can be implemented based on the following pseudo code of Table 5:

TABLE 5

```
Inputs:
Shuffle_control = identity;
F = masks for valid elements in Vb
Operations:
For (i=0; i<SIMD_WIDTH; i++) {
    If (F[i] is valid) {
        For (j=i+1; j<SIMD_WIDTH; j++) {
            If ((F[j] is valid) and (Vb[i] == Vb[j])) {
                Set shuffle_control for j->i shuffle;
                F[j] = invalid;
                Break;
            }
        }
    }
}
```

The all-to-all element-wise compare can be implemented in stages, and the shuffle-control can be generated by using a pre-programmed lookup table, in one embodiment.

Appendix III shows use of this instruction for the second operation of a scalar reduction.

Embodiments may provide a further instruction to enable efficient SIMD execution of histogram calculations through efficient handling of the case where multiple indices in a SIMD register are the same. Such instruction may compute the population count of unique integer values in a source SIMD register. The outputs are a SIMD register holding the population count of unique elements and a mask register indicating which elements are unique. In one embodiment, this instruction, referred to as vitemcount, may have the following format:

| Opcode | Destination | Source | Mask | Description |
|---|---|---|---|---|
| vitemcount | Vd | Vs | F | Identifies and counts the identical elements in vector Vs and stores the count in Vd. Sets the writemask F corresponding to unique elements of Vs. |

As an example of operation, assume an initial state as follows (where '-' signifies don't care values):

|  | 7 | 6 | 5 | 4 | 3 | 2 | 1 | 0 |
|---|---|---|---|---|---|---|---|---|
| Vs: | 15 | 10 | 15 | 0 | 10 | 15 | 10 | 1 |
| Vd: | — | — | — | — | — | — | — | — |
| Fmask | 1 | 1 | 0 | 1 | 1 | 1 | 1 | 1 |

After the vitemcount instructions, the state is as follows:

|  | 7 | 6 | 5 | 4 | 3 | 2 | 1 | 0 |
|---|---|---|---|---|---|---|---|---|
| Vs: | 15 | 10 | 15 | 0 | 10 | 15 | 10 | 1 |
| Vd: | — | — | — | 1 | — | 2 | 3 | 1 |
| Fmask | 0 | 0 | 0 | 1 | 0 | 1 | 1 | 1 |

The population count of each element Vs[i] of Vs is stored in Vd[i]. The unique indices in Vs have their corresponding writemask set in Fmask.

With this vitemcount instruction, a SIMD histogram computation can be provided as follows in Table 6:

TABLE 6

```
for(i=0; i < N; i+=SIMD_WIDTH)                // N - input size
{
  Vind = compute_bin_index_SIMD(I,i);  // computes vector of indices
  F = all valid;                       // initialize F to all 1
  vitemcount Vcount, Vind, F;          // perform vector population count
                                       // and set mask F for unique elements
  Vhist = vgather(Vind, histogram, F); // gather unique histogram
                                       // values under mask
  Vhist= Vhist + Vcount;               // accumulate histogram values
  vscatter(Vind, Vhist, histogram, F); // scatter updated unique
                                       // histogram values under mask
}
```

As shown in Table 6, this computation executes in four stages. In the first stage, the source register Vs and the mask F are read from a vector register file (VRF) and a mask register file (RF), respectively. In the second stage, an all-to-all comparison is performed to identify unique elements in Vs. The result of the second stage is a 4-bit tag associated with each element Vs[i] of Vs, such that a group of two or more identical elements have the same tag. The third pipeline stage uses the 4-bit tags to count the number of elements in each group of identical elements. In the fourth and final stage, the count vector and mask are written into Vd and F, respectively. In some implementations, this instruction will enable histogram computation in parallel, and can provide a speedup over a serial implementation.

Figure 3:
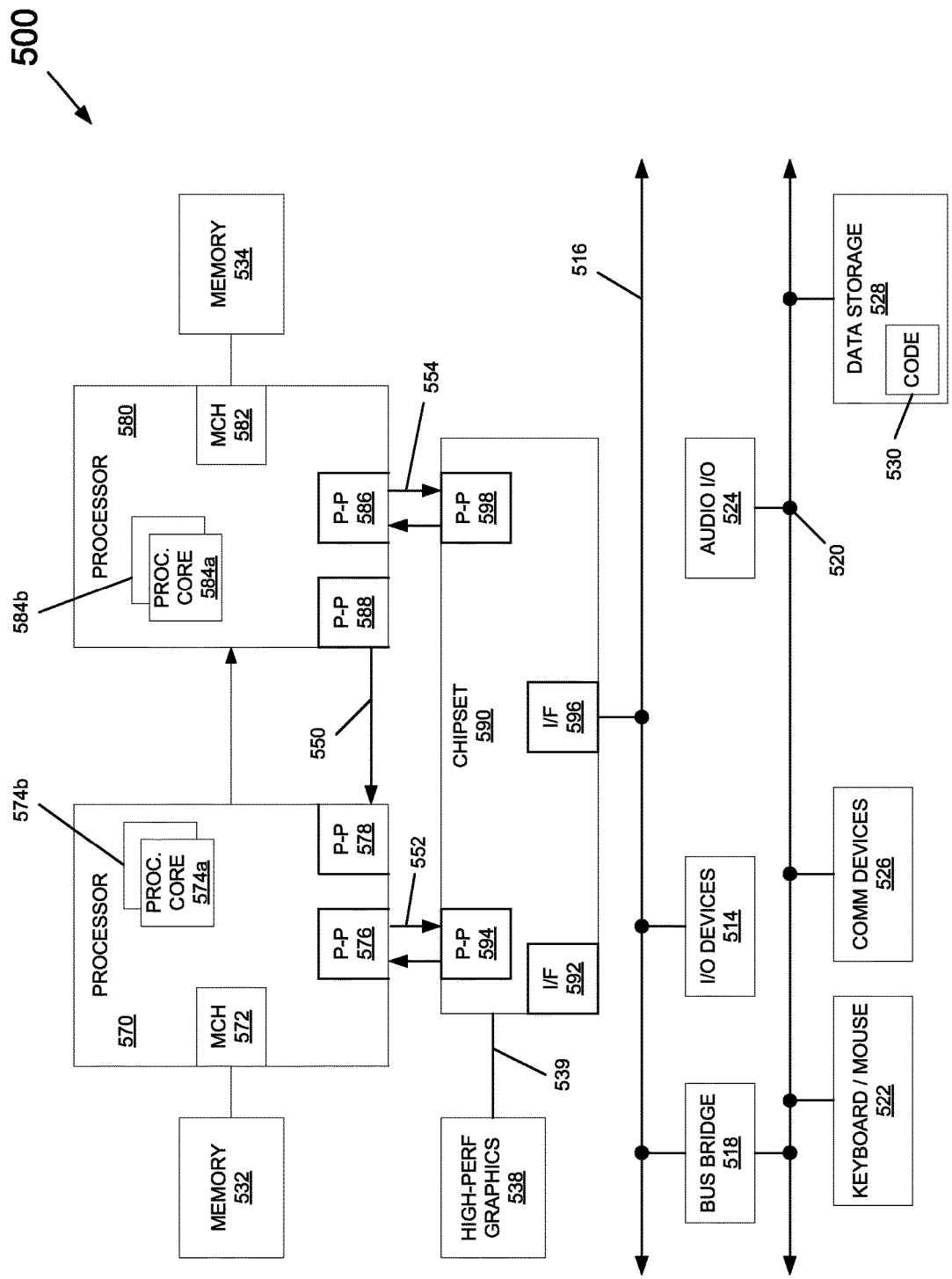
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 500 is a point-to-point interconnect system, and includes a first processor 570 and a second processor 580 coupled via a point-to-point interconnect 550. As shown in FIG. 3, each of processors 570 and 580 may be multicore processors, including first and second processor cores (i.e., processor cores 574a and 574b and processor cores 584a and 584b). Each processor core may include logic such as shown in FIGS. 1A and 1B to enable execution of single instruction vector operations in accordance with an embodiment of the present invention. In this way atomic vector operations may be performed, and various code may be executed to leverage the vector instructions described herein.

Still referring to FIG. 3, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 3, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 3, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

APPENDIX I

```
// SIMD_WIDTH is the number of elements in a SIMD register
// k1 is the input mask
// mvt is a vector memory operand
// instruction works over a subset of the write mask
ktemp = SELECT_SUBSET(k1)
k1 = SET_TO_ALL_0(K1)
// Use mvt as vector memory operand (VSIB)
for (n = 0; n < SIMD_WIDTH; n++) {
  if (ktemp[n] != 0) {
    i = 32*n
    // mvt[n] = BASE_ADDR + SignExtend(VINDEX[i+31:i] * SCALE)
    pointer[63:0] = mvt[n]
    // Set_Reservation_Location push pointer into a content addressable
memory (CAM) structure used latter for look up
      Set_Reservation_Location(pointer)
    v1[i+31:i] = FullUpConvLoad32(pointer)
    k1[n] = 1
  }
}
```

APPENDIX II the vscattercond should have the following external behavior.

```
// SIMD_WIDTH is the number of elements in a SIMD register
// k1 is the input mask
// mvt is a vector memory operand
// instruction works over a subset of the write mask
ktemp = SELECT_SUBSET(k1)
k1 = SET_TO_ALL_0(K1)
```

APPENDIX II-continued the vscattercond should have the following external behavior.

```
// Use mvt as vector memory operand (VSIB)
for (n = 0; n < SIMD_WIDTH; n++) {
  if (ktemp[n] != 0) {
    i = 32*n
    // mvt[n] = BASE_ADDR + SignExtend(VINDEX[i+31:i] * SCALE)
    pointer[63:0] = mvt[n]
    // Check_Reservation compare the pointer to CAM structure to
see if the reservation
    // is still good. If so, it returns true. Otherwise, it returns fails.
    if (Check_Reservation(pointer)) {
      tmp = DownConv32(v2[i+31:i], downconv)
      if(DownConvSize32(downconv) == 4) {
        MemStore(pointer) = tmp[31:0]
      } else if(DownConvSize32(downconv) == 2) {
        MemStore(pointer) = tmp[15:0]
      } else if(DownConvSize32(downconv) == 1) {
        MemStore(pointer) = tmp[7:0]
      }
      k1[n] = 1
    }
    // If Check_Reservation fails, it means some other threads have
touched this location
    // while it is under reservation in this thread
    else {
      k1[n] = 0;
    }
  }
}
```

APPENDIX III

Initial state ('—' signifies don't care values), SC = Shuffle_Control is a scalar operand, but represented here as a vector for ease of understanding.

|       | 7        | 6        | 5        | 4        | 3        | 2        | 1        | 0        |
|-------|----------|----------|----------|----------|----------|----------|----------|----------|
| Vb:   | 15       | 13       | 15       | 0        | 10       | 15       | 10       | 15       |
| Vc:   | 17.0     | 16.0     | 15.0     | 14.0     | 13.0     | 12.0     | 11.0     | 10.0     |
| F:    | 1        | 1        | 1        | 1        | 1        | 1        | 1        | 1        |
| F1:   | 1        | 1        | 1        | 1        | 1        | 1        | 1        | 1        |
| Vtmp: | —        | —        | —        | —        | —        | —        | —        | —        |
| SC    | Identity | Identity | Identity | Identity | Identity | Identity | Identity | Identity |

L1: vshuf2reduce SC,, Vb, F updates F and SC

|       | 7        | 6        | 5        | 4        | 3        | 2        | 1        | 0        |
|-------|----------|----------|----------|----------|----------|----------|----------|----------|
| Vb:   | 15       | 13       | 15       | 0        | 10       | 15       | 10       | 15       |
| Vc:   | 17.0     | 16.0     | 15.0     | 14.0     | 13.0     | 12.0     | 11.0     | 10.0     |
| F:    | 0        | 1        | 1        | 1        | 0        | 0        | 1        | 1        |
| F1:   | 1        | 1        | 1        | 1        | 1        | 1        | 1        | 1        |
| Vtmp: | —        | —        | —        | —        | —        | —        | —        | —        |
| SC    | 7->5     | Identity | Identity | Identity | 3->1     | 2->0     | Identity | Identity |

At this point, if the initial values of Vb are all unique, the F masks will still be all 1 s. It effectively will be the same as F1 mask and the while loop (L4 to L9) would have not be executed and Operation 2 would complete. In this example, the F mask is not the same as the F1 mask because some elements of Vb are identical. Thus, we will execute the loop (L4 to L9)

L4: Vshuffle, updates Vtmp.

|       | 7        | 6        | 5        | 4        | 3        | 2        | 1        | 0        |
|-------|----------|----------|----------|----------|----------|----------|----------|----------|
| Vb:   | 15       | 13       | 15       | 0        | 10       | 15       | 10       | 15       |
| Vc:   | 17.0     | 16.0     | 15.0     | 14.0     | 13.0     | 12.0     | 11.0     | 10.0     |
| F:    | 0        | 1        | 1        | 1        | 0        | 0        | 1        | 1        |
| F1:   | 1        | 1        | 1        | 1        | 1        | 1        | 1        | 1        |
| Vtmp: | —        | —        | 17.0     | —        | —        | —        | 13.0     | 12.0     |
| SC    | 7->5     | Identity | Identity | Identity | 3->1     | 2->0     | Identity | Identity |

L5: Vadd updates Vc.

|   | 7 | 6 | 5 | 4 | 3 | 2 | 1 | 0 |
|---|---|---|---|---|---|---|---|---|

APPENDIX III-continued

| Vb: | 15 | 13 | 15 | 0 | 10 | 15 | 10 | 15 |
|---|---|---|---|---|---|---|---|---|
| Vc: | 17.0 | 16.0 | 32.0 | 14.0 | 13.0 | 12.0 | 24.0 | 22.0 |
| F: | 0 | 1 | 1 | 1 | 0 | 0 | 1 | 1 |
| F1: | 1 | 1 | 1 | 1 | 1 | 1 | 1 | 1 |
| Vtmp: | — | — | 17.0 | — | — | — | 13.0 | 12.0 |
| SC | 7->5 | Identity | Identity | Identity | 3->1 | 2->0 | Identity | Identity |

In the loop between L4 and L9, the vshuf2reduce, vshuffle and vadd are repeatedly called until the mask no longer changes. That signifies the end of the reduction operation.

L6: F1 = F updates F1

| | 7 | 6 | 5 | 4 | 3 | 2 | 1 | 0 |
|---|---|---|---|---|---|---|---|---|
| Vb: | 15 | 13 | 15 | 0 | 10 | 15 | 10 | 15 |
| Vc: | 17.0 | 16.0 | 32.0 | 14.0 | 13.0 | 12.0 | 24.0 | 22.0 |
| F: | 0 | 1 | 1 | 1 | 0 | 0 | 1 | 1 |
| F1: | 0 | 1 | 1 | 1 | 0 | 0 | 1 | 1 |
| Vtmp: | — | — | 17.0 | — | — | — | 13.0 | 12.0 |
| SC | 7->5 | Identity | Identity | Identity | 3->1 | 2->0 | Identity | Identity |

L7: vshuf2reduce SC,, Vb, F updates F and SC

| | 7 | 6 | 5 | 4 | 3 | 2 | 1 | 0 |
|---|---|---|---|---|---|---|---|---|
| Vb: | 15 | 13 | 15 | 0 | 10 | 15 | 10 | 15 |
| Vc: | 17.0 | 16.0 | 32.0 | 14.0 | 13.0 | 12.0 | 24.0 | 22.0 |
| F: | 0 | 1 | 0 | 1 | 0 | 0 | 1 | 1 |
| F1: | 0 | 1 | 1 | 1 | 0 | 0 | 1 | 1 |
| Vtmp: | — | — | 17.0 | — | — | — | 13.0 | 12.0 |
| SC | — | Identity | 5->0 | Identity | — | — | Identity | Identity |

L9 loops back to L4. Since F and F1 are still different, we would need to execute the loop for one more iteration.

L4: Vshuffle, updates Vtmp.

| | 7 | 6 | 5 | 4 | 3 | 2 | 1 | 0 |
|---|---|---|---|---|---|---|---|---|
| Vb: | 15 | 13 | 15 | 0 | 10 | 15 | 10 | 15 |
| Vc: | 17.0 | 16.0 | 32.0 | 14.0 | 13.0 | 12.0 | 24.0 | 22.0 |
| F: | 0 | 1 | 0 | 1 | 0 | 0 | 1 | 1 |
| F1: | 0 | 1 | 1 | 1 | 0 | 0 | 1 | 1 |
| Vtmp: | — | — | — | — | — | — | — | 32.0 |
| SC | — | Identity | 5->0 | Identity | — | — | Identity | Identity |

L5: Vadd updates Vc.

| | 7 | 6 | 5 | 4 | 3 | 2 | 1 | 0 |
|---|---|---|---|---|---|---|---|---|
| Vb: | 15 | 13 | 15 | 0 | 10 | 15 | 10 | 15 |
| Vc: | 17.0 | 16.0 | 32.0 | 14.0 | 13.0 | 12.0 | 24.0 | 54.0 |
| F: | 0 | 1 | 0 | 1 | 0 | 0 | 1 | 1 |
| F1: | 0 | 1 | 1 | 1 | 0 | 0 | 1 | 1 |
| Vtmp: | — | — | — | — | — | — | — | 32.0 |
| SC | — | Identity | 5->0 | Identity | — | — | Identity | Identity |

L6: F1 = F updates F1

| | 7 | 6 | 5 | 4 | 3 | 2 | 1 | 0 |
|---|---|---|---|---|---|---|---|---|
| Vb: | 15 | 13 | 15 | 0 | 10 | 15 | 10 | 15 |
| Vc: | 17.0 | 16.0 | 32.0 | 14.0 | 13.0 | 12.0 | 24.0 | 22.0 |
| F: | 0 | 1 | 0 | 1 | 0 | 0 | 1 | 1 |
| F1: | 0 | 1 | 0 | 1 | 0 | 0 | 1 | 1 |
| Vtmp: | — | — | — | — | — | — | — | 32.0 |
| SC | — | Identity | 5->0 | Identity | — | — | Identity | Identity |

L7: vshuf2reduce SC,, Vb, F does not find any more elements of Vb vector that are the same. Thus, it does not update F nor SC.

| | 7 | 6 | 5 | 4 | 3 | 2 | 1 | 0 |
|---|---|---|---|---|---|---|---|---|
| Vb: | 15 | 13 | 15 | 0 | 10 | 15 | 10 | 15 |
| Vc: | 17.0 | 16.0 | 32.0 | 14.0 | 13.0 | 12.0 | 24.0 | 22.0 |
| F: | 0 | 1 | 0 | 1 | 0 | 0 | 1 | 1 |
| F1: | 0 | 1 | 0 | 1 | 0 | 0 | 1 | 1 |
| Vtmp: | — | — | 17.0 | — | — | — | 13.0 | 12.0 |
| SC | — | Identity | — | Identity | — | — | Identity | Identity |

L9: loop back to the top of the while loop to test the condition. This time, F and F1 are the same and the loop exits. The final states of the variables are as follows:

APPENDIX III-continued

|     | 7    | 6    | 5    | 4    | 3    | 2    | 1    | 0    |
|-----|------|------|------|------|------|------|------|------|
| Vb: | 15   | 13   | 15   | 0    | 10   | 15   | 10   | 15   |
| Vc: | 17.0 | 16.0 | 32.0 | 14.0 | 13.0 | 12.0 | 24.0 | 54.0 |
| F:  | 0    | 1    | 0    | 1    | 0    | 0    | 1    | 1    |
| F1: | 0    | 1    | 0    | 1    | 0    | 0    | 1    | 1    |

What is claimed is:

1. A processor comprising:
a single instruction multiple data (SIMD) unit to perform operations on a plurality of data elements responsive to a single instruction; and
a control unit coupled to the SIMD unit to provide the plurality of data elements to the SIMD unit, and to enable the SIMD unit to perform a single item count SIMD instruction, the single item count SIMD instruction having a format to identify a destination storage, a source location of a register file and a mask of a mask register file, to generate a count of identical elements of a third vector of the source location having a third plurality of data elements, the count of identical elements corresponding to a population count of unique integer values in the third vector, and to store the population count of unique integer values in a data element of the destination storage corresponding to one of the third plurality of data elements having the unique integer value, and to further write an indicator of the mask to indicate each unique element, to compute a histogram in parallel, wherein the control unit is to perform an all-to-all comparison between the third plurality of data elements to associate a tag with each of the third plurality of data elements, a group of two or more identical elements of the third plurality of data elements having the same tag to identify the unique integer values.

2. The processor of claim 1, wherein the control unit is to enable an atomic SIMD operation to be performed on at least some of the plurality of data elements responsive to a first SIMD instruction to be executed under a first mask and a second SIMD instruction to be executed under a second mask, wherein the first SIMD instruction is to obtain the plurality of data elements from first memory locations and reserve the first memory locations, pursuant to an input mask corresponding to the first mask.

3. The processor of claim 2, wherein the second SIMD instruction is to store a second plurality of data elements from a source location to the first memory locations that are reserved, pursuant to an input mask corresponding to the second mask, and wherein the first SIMD instruction is to cause generation of the second mask.

4. The processor of claim 1, wherein the control unit is to enable the SIMD unit to perform a third SIMD instruction to compare a second vector having a second plurality of data elements and to output a shuffle control to indicate groups of the data elements having the same value, and to set indicators of a third mask to indicate non-unique data elements of the second plurality of data elements.

5. The processor of claim 1, wherein the control unit is to compute the histogram in parallel responsive to the single item count SIMD instruction.

6. The processor of claim 1, wherein other data elements of the destination storage corresponding to the unique integer value are set at a don't care state.

7. The processor of claim 1, wherein the control unit is to store the population count for a first unique integer value in a least significant data element of the destination storage corresponding to a least significant instance of the unique integer value in the third plurality of data elements.

8. The processor of claim 1, wherein the control unit is to store the population indicator for a first unique integer value in a least significant data element of the mask storage corresponding to a least significant instance of the unique integer value in the third plurality of data elements.

9. A system comprising:
a processor including a plurality of functional units including a vector processing unit having logic to execute an item count single instruction multiple data (SIMD) instruction to perform a histogram calculation on data elements of a source vector to determine unique data elements of the source vector, to generate a count of occurrences of each unique data element of the source vector corresponding to a population count for each unique data element, and to store the population count for each unique data element in an element of a destination storage corresponding to one of the data elements of the source vector having the unique data element, the item count SIMD instruction having a format to identify the destination storage, the source vector in a location of a register file and a mask of a mask register file, wherein the logic is to perform an all-to-all comparison between the data elements of the source vector to associate a tag with each of the data elements of the source vector, a group of two or more identical elements of the data elements of the source vector having the same tag to identify the unique data elements; and
a dynamic random access memory (DRAM) coupled to the processor.

10. The system of claim 9, wherein the logic is to execute a first stage to read the source vector and the mask.

11. The system of claim 10, wherein the logic is to execute a second stage to perform the all-to-all comparison on the source vector to identify the unique data elements of the source vector.

12. The system of claim 11, wherein the logic is to execute a third stage to count the occurrence of each unique data element of the source vector.

13. The system of claim 12, wherein the logic is to execute a fourth stage to store each occurrence count into a corresponding element of the destination storage.

14. The system of claim 13, wherein the logic is to store first entries in the mask to a first state to indicate a first occurrence of each unique data element and store second entries in the mask to a second state to indicate other occurrences of each unique data element.

15. A non-transitory machine-readable medium having stored thereon instructions, which if performed by a machine cause the machine to perform a method comprising:

reading a source vector and a mask responsive to a single instruction multiple data (SIMD) histogram instruction, the SIMD histogram instruction to cause computation of a population count of unique integer values in the source vector, the SIMD histogram instruction having a format to identify a destination storage, a location of the source vector in a register file and the mask of a mask register file;

performing an all-to-all comparison on the source vector to identify unique data elements of the source vector, including to associate a tag with each of the data elements of the source vector, a group of two or more identical elements of the data elements of the source vector having the same tag to identify the unique data elements;

counting the occurrence of each unique data element of the source vector;

storing each occurrence count into a corresponding element of the destination storage; and storing first entries in the mask to a first state to indicate a first occurrence of each unique data element and storing second entries in the mask to a second state to indicate other occurrences of each unique data element.

* * * * *